(12) United States Patent
Schwerdtner

(10) Patent No.: US 8,325,401 B2
(45) Date of Patent: Dec. 4, 2012

(54) METHOD FOR GENERATING VIDEO HOLOGRAMS IN REAL-TIME FOR ENHANCING A 3D-RENDERING GRAPHIC PIPELINE

(75) Inventor: Alexander Schwerdtner, Dresden (DE)

(73) Assignee: SeeReal Technologies S.A., Munsbach (LU)

( * ) Notice: Subject to any disclaimer, the term of this patent is extended or adjusted under 35 U.S.C. 154(b) by 581 days.

(21) Appl. No.: 12/600,316

(22) PCT Filed: May 16, 2008

(86) PCT No.: PCT/EP2008/056022

§ 371 (c)(1),
(2), (4) Date: Nov. 16, 2009

(87) PCT Pub. No.: WO2008/138979

PCT Pub. Date: Nov. 20, 2008

(65) Prior Publication Data

US 2010/0149609 A1 Jun. 17, 2010

(30) Foreign Application Priority Data

May 16, 2007 (DE) .......................... 10 2007 023 737

(51) Int. Cl.
*G03H 1/08* (2006.01)
(52) U.S. Cl. ............................................................ 359/9
(58) Field of Classification Search ........................ 359/9
See application file for complete search history.

(56) References Cited

U.S. PATENT DOCUMENTS

2010/0149314 A1* 6/2010 Schwerdtner et al. .......... 348/41
2010/0149610 A1* 6/2010 Schwerdtner et al. .......... 359/32

FOREIGN PATENT DOCUMENTS

| DE | 10 2006 004 300 | 8/2007 |
|---|---|---|
| DE | 10 2006 025 096 | 11/2007 |
| DE | 10 2006 042 324 | 3/2008 |
| EP | 0 862 096 | 9/1998 |
| WO | WO 02/39194 | 5/2002 |
| WO | WO 2004/044659 | 5/2004 |
| WO | WO 2006/027228 | 3/2006 |
| WO | WO 2006/066919 | 6/2006 |
| WO | WO 2006/119760 | 11/2006 |
| WO | WO 2008/025839 | 3/2008 |

OTHER PUBLICATIONS

International Search Report, dated Aug. 20, 2008, issued in priority International Application No. PCT/EP2008/056022.
Takahashi et al., "Direct volume access by an improved electro-holography image generator," Proc. of the SPIE, vol. 2406, pp. 220-225 (Jan. 1, 1995) XP007903699.
Shimobaba et al., "Electroholographic display unit for three-dimensional display by use of special-purpose computational chip for holography and reflective LCD panel," Optics Express, vol. 13, No. 11, pp. 4196-4201 (May 30, 2005) XP002402619.

* cited by examiner

*Primary Examiner* — Alessandro Amari
(74) *Attorney, Agent, or Firm* — Saul Ewing LLP

(57) ABSTRACT

A method for generating video holograms is disclosed, principally for a holographic reproduction device, having at least one light modulator in which a scene which is deconstructed into object points is encoded as a complete hologram and can be viewed as a reconstruction from a visibility region. A 3D-rendering graphic pipeline determines color and depth information for the object points of the scene, from which a holographic pipeline determines the complex hologram values.

18 Claims, 9 Drawing Sheets

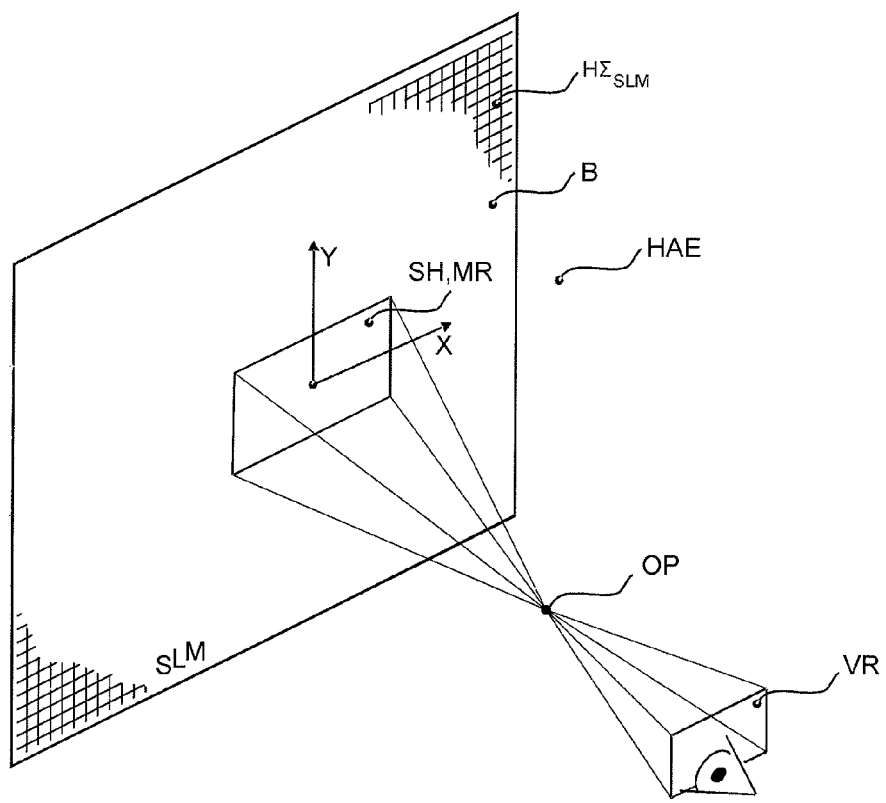
Fig. B1

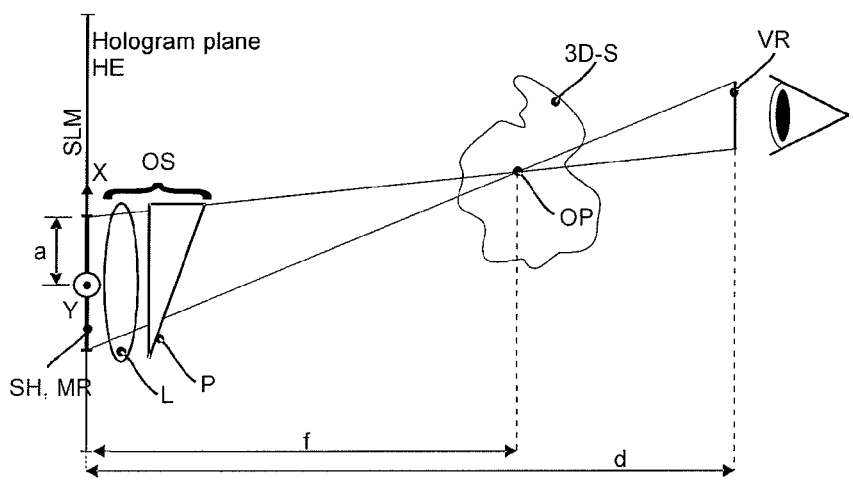
Fig. B2a

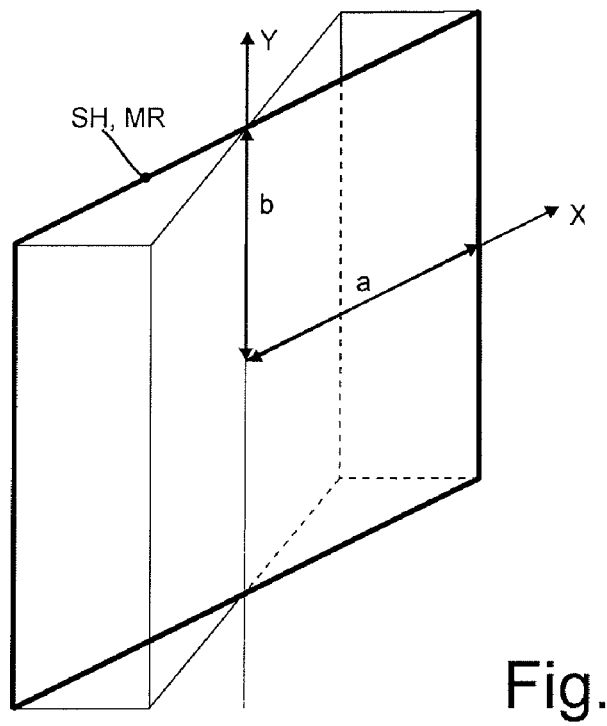
Fig. B2b
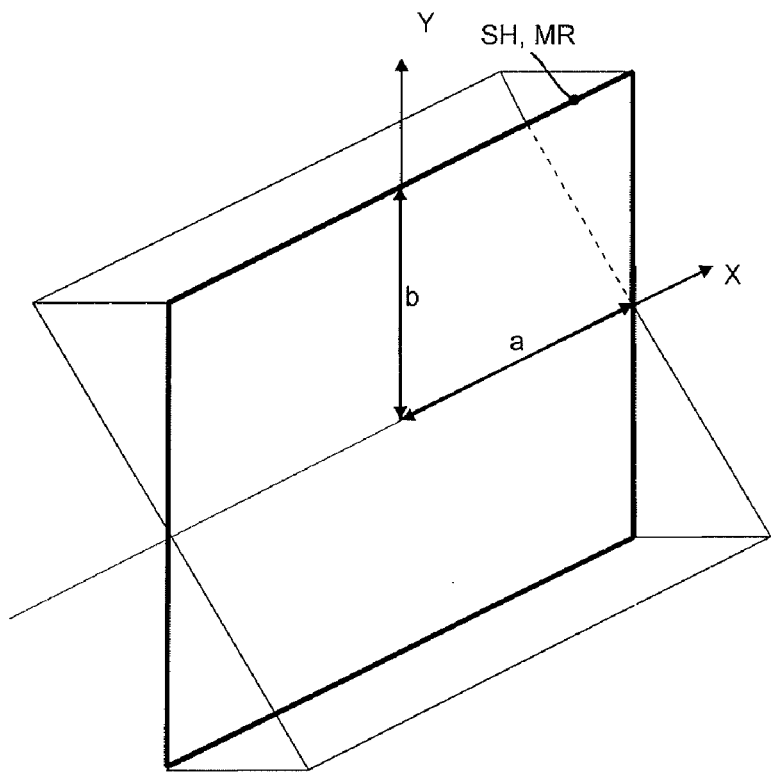
Fig. B2c

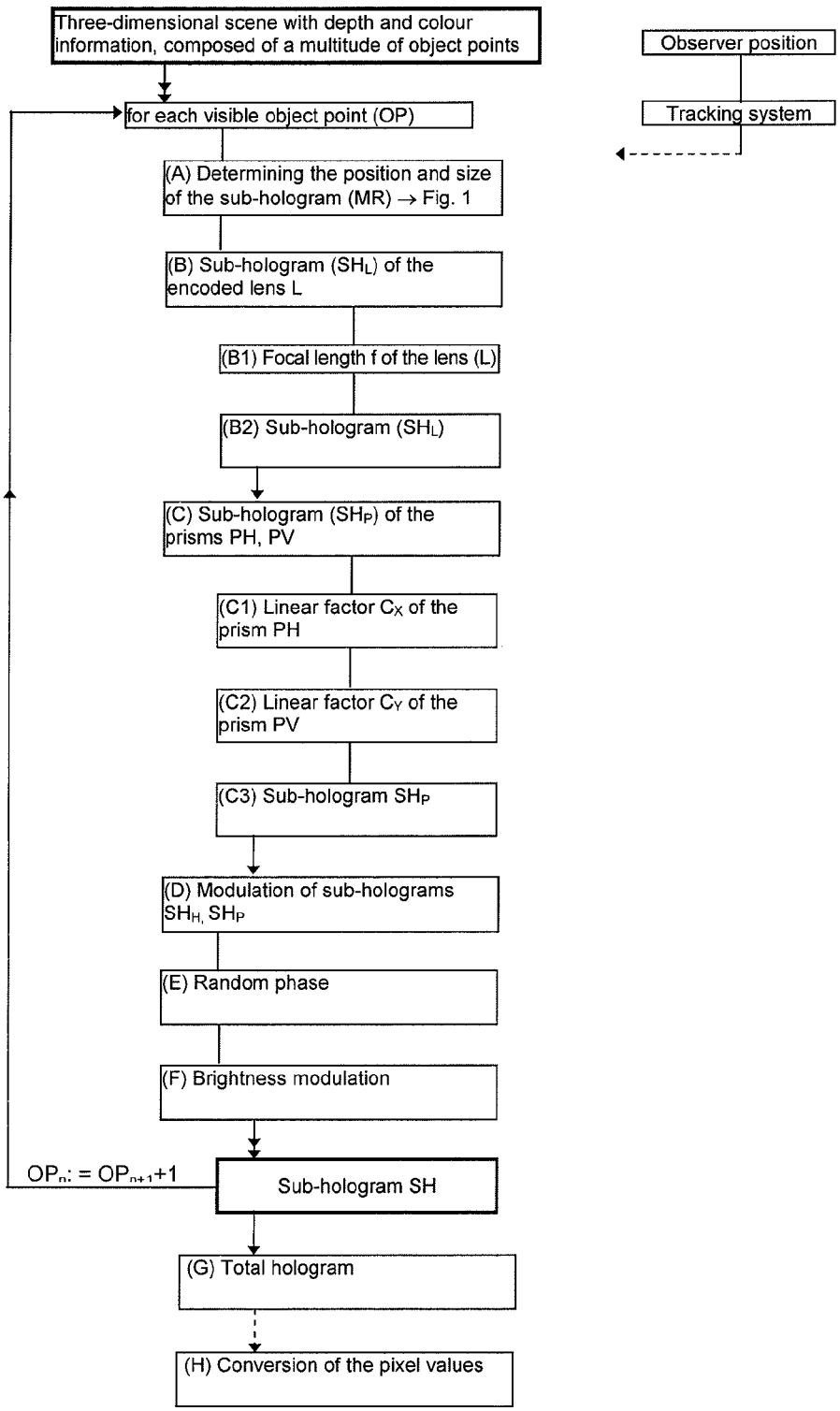
Fig. B3

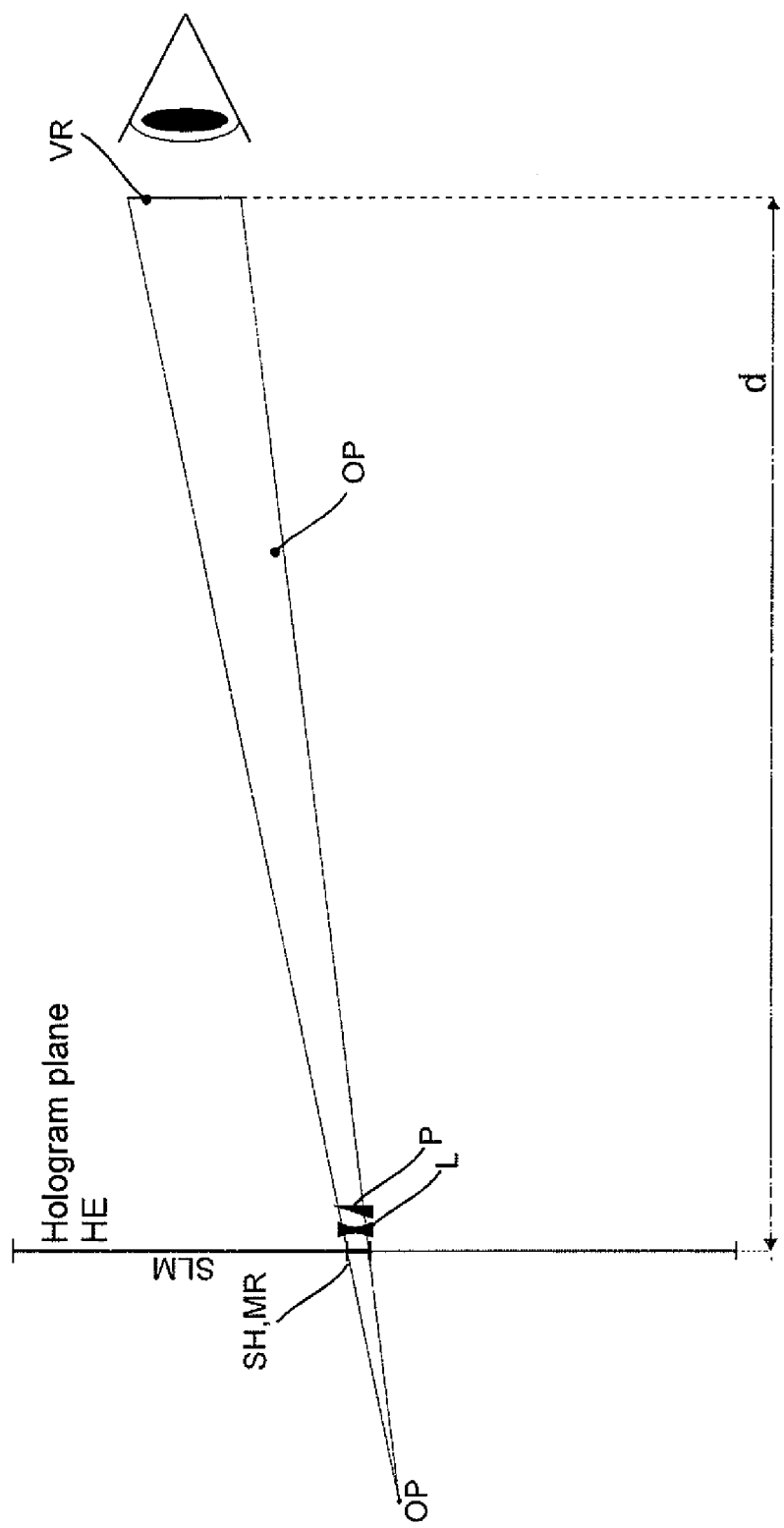
Fig. B4

METHOD FOR GENERATING VIDEO HOLOGRAMS IN REAL-TIME FOR ENHANCING A 3D-RENDERING GRAPHIC PIPELINE

CROSS REFERENCE TO RELATED APPLICATIONS

This application claims the priority of PCT/EP2008/056022, filed on May 16, 2008, which claims priority to German Application No. 10 2007 023737.7, filed May 16, 2007, the entire contents of which are hereby incorporated in total by reference.

BACKGROUND OF THE INVENTION

The present invention relates to a method for generating video holograms in real time from three-dimensional image data with depth information for extending a 3D rendering graphics pipeline.

As regards the rendering process, the invention relates to the 3D rendering pipeline or graphics pipeline, which comprises the algorithms from the vectorial, mathematical description of a scene to the pixelated image on the monitor screen. The three-dimensional image data comprise depth information and usually also additional information about material and surface properties. For example, the conversion of screen coordinates into device coordinates, texturing, clipping and anti-aliasing are performed in the 3D rendering graphics pipeline. The pixelated image, which represents a two-dimensional projection of the three-dimensional scene, and which is stored in the frame buffer of a graphics adapter, comprises the pixel values for the controllable pixels of a monitor screen, for example an LC display.

As far as the generation of holographic data is concerned, the invention relates to methods and devices for the generation of hologram values for the representation of the three-dimensional scene, which is composed of object points, on light modulator means of a holographic display device.

As regards the video holograms, this invention also relates to a holographic pipeline. Complex hologram values are generated in this pipeline in the form of pixel values for a light modulator of a holographic display device.

Such a holographic display device is substantially based on the principle that a sub-hologram is defined together with each object point of the scene to be reconstructed and that the entire hologram is formed by superposition of sub-holograms, with the help of at least one light modulator means on which a scene which is divided into object points is encoded as a entire hologram and where the scene can be seen as a reconstruction from a visibility region which lies within one periodicity interval of the reconstruction of the video hologram. In general, the principle is to reconstruct mainly that wave front that would be emitted by an object into one or multiple visibility regions.

In detail, such a device is based on the principle that the reconstruction of an individual object point only requires a sub-hologram as a subset of the entire hologram encoded on the light modulator means. The holographic display device comprises at least one screen means. The screen means is either the light modulator itself where the hologram of a scene is encoded or an optical element—such as a lens or a mirror—onto which a hologram or wave front of a scene encoded on the light modulator is imaged.

The definition of the screen means and the corresponding principles for the reconstruction of the scene in the visibility region are described in other documents filed by the applicant. In documents WO 2004/044659 and WO 2006/027228, the light modulator itself forms the screen means. In document WO 2006/119760, titled "Projection device and method for holographic reconstruction of scenes", the screen means is an optical element onto which a hologram which is encoded on the light modulator is imaged.

In document DE 10 2006 004 300.6, "Projection device for the holographic reconstruction of scenes", the screen means is an optical element onto which a wave front of the scene encoded on the light modulator is imaged.

Document WO 2006/066919 filed by the applicant describes a method for computing video holograms.

A 'visibility region' is a limited region through which the observer can watch the entire reconstruction of the scene at sufficient visibility. Within the visibility region, the wave fields interfere such that the reconstructed scene becomes visible for the observer. The visibility region is located on or near the eyes of the observer. The visibility region can be moved in the x, y and z directions and is tracked to the actual observer position with the help of known position detection and tracking systems. It is possible to use two visibility regions, one for each eye. Generally, more complex arrangements of visibility regions are also possible. It is further possible to encode video holograms such that individual objects or the entire scene seemingly lie behind the light modulator for the observer.

In this document, the term 'light modulator means' or 'SLM' denotes a device for controlling intensity, colour and/or phase of light by way of switching, gating or modulating light beams emitted by one or multiple independent light sources. A holographic display device typically comprises a matrix of controllable pixels, which reconstruct object points by modifying the amplitude and/or phase of light which passes through the display panel. A light modulator means comprises such a matrix. The light modulator means may for example be an acousto-optic modulator AOM or a continuous-type modulator. One embodiment for the reconstruction of the holograms by way of amplitude modulation can take advantage of a liquid crystal display (LCD). The present invention also relates to further controllable devices which are used to modulate sufficiently coherent light into a light wave front or into a light wave contour.

The term 'pixel' denotes a controllable hologram pixel of the light modulator, it represents a discrete value of the hologram point and is addressed and controlled discretely. Each pixel represents a hologram point of the hologram. In the case of an LC display, a pixel is a discretely controllable display pixel. In the case of a DMD (Digital Micro-mirror Device), such as a DLP (Digital Light Processor), a pixel is a discretely controllable micro-mirror or small group of such mirrors. In the case of a continuous light modulator, a pixel is an imaginary region which represents the hologram point. In the case of a colour representation, a pixel is typically sub-divided into multiple sub-pixels, which represent the primary colours.

The term 'transformation' shall be construed such to include any mathematical or computational technique which is identical to or which approximates a transformation. Transformations in a mathematical sense are merely approximations of physical processes, which are described more precisely by the Maxwellian wave equations. Transformations such as Fresnel transformations or the special group of transformations which are known as Fourier transformations, describe second-order approximations. Transformations are usually represented by algebraic and non-differential equations and can therefore be handled efficiently and at high performance using known computing means. Moreover, they can be modelled precisely using optical systems.

Document WO 2006/066919 filed by the applicant describes a method for computing video holograms. It generally includes the steps of slicing the scene into section planes which are parallel to the plane of a light modulator, of transforming all section planes in the observer plane into a visibility region, and of adding them up there. Then, the added results are back-transformed into the hologram plane, where also the light modulator is disposed, thus determining the complex hologram values of the video hologram.

Document DE 10 2006 025 096 describes a method for rendering and generating video holograms in real time from image data with depth information, where a 3D rendering graphics pipeline generates pixel values for the controllable pixels of a monitor in a first mode. It is characterised in that the pipeline is extended in a switchable manner such that in a second mode complex hologram values are generated as pixel values for a spatial light modulator SLM in at least one holographic pipeline, so that simultaneously or alternatively to the usual graphic representation the spatial light modulator is controlled with the hologram values in order to modulate an incident wave field such that the three-dimensional scene is reconstructed through interference in space.

Document DE 10 2006 042 324 describes a method for the real-time generation of video holograms. That method uses the principle that the reconstruction of a single object point only requires a sub-hologram as a subset of the entire hologram which is encoded on the SLM. It is characterised in that for each object point the contributions of the sub-holograms can be retrieved from look-up tables, and that said sub-holograms are accumulated so to form an entire hologram in order to reconstruct the entire scene.

The described methods allow the hologram values to be generated at a fast pace. However, it is necessary to include the 3D rendering graphics pipeline into further considerations. The results of a 3D rendering graphics pipeline, which describes the conversion of a three-dimensional scene into pixelated image data in the form of a two-dimensional projection of the three-dimensional scene, are provided in two memory sections, namely the frame buffer and Z buffer: The frame buffer comprises the colour values or colour information, i.e. the colour map of the scene as seen by the observer. The Z buffer comprises the depth map or depth information of the scene in a normalised representation, as seen from the observer position. Those data serve as input data for the holographic pipeline, which follows in line, and which generates complex hologram values in the form of pixel values for the light modulator. A holographic transformation can only be performed when the result of the 3D rendering graphics pipeline is available completely, i.e. when all pixelated image data are written to the frame buffer and Z buffer. The entire three-dimensional scene must be rendered by the 3D rendering graphics pipeline and the pixelated image data must be generated completely before a holographic transformation becomes possible. The mentioned pipelines are performed sequentially, i.e. one after another, which results in a disadvantageously long computing time. As a result of the long computing time, video sequences can for example not be provided with the desired refresh frequency.

However, as in conventional video technologies, a high refresh rate is desired and indispensable when displaying video holograms. Moreover, because of the great number of required computing steps, the generation of the video holograms causes a great computational load and requires high-performance and costly computing units.

SUMMARY OF THE INVENTION

It is the object of the present invention to overcome the disadvantages of the prior art and to provide a method to avoid that the 3D rendering graphics pipeline and holographic pipeline are performed one after another. The required computing time shall be reduced substantially. As a consequence, the costs and technical effort for the computation shall also be reduced. Further, the architecture of graphics cards or 3D pipelines commercially available today shall be extended by additional hardware and software modules in order to implement the method and thus to make it possible for video holograms to be generated in real time.

The method is used for generating video holograms in real time for extending a 3D rendering graphics pipeline, which describes the conversion of the three-dimensional scene into pixelated image data in the form of a two-dimensional projection of the three-dimensional scene.

Thereafter, a holographic pipeline serves to generate complex hologram values in the form of pixel values for a light modulator of a holographic display device with at least one light modulator means on which a scene which is divided into object points is encoded as an entire hologram and which can be seen as a reconstruction from a visibility region which lies within one periodicity interval of the reconstruction of the video hologram, where the visibility region defines a sub-hologram together with each object point of the scene to be reconstructed, and where the entire hologram is formed by way of a superposition of sub-holograms, and where a 3D rendering graphics pipeline structures a scene, which is represented by image data with depth information, into object points (OP), and then determines and provides at least colour and depth information for the object points. Such a holographic display device with light modulator means is based on the principle that the wave fronts which are modulated with the information of object points of a scene are superimposed in at least one visibility region. The definition of a visibility region has already been given above.

Such a holographic display device, and also the present invention are based on the principle that the reconstruction of an individual object point of a scene only requires a sub-hologram as a subset of the entire hologram encoded on the light modulator means.

Each single object point is created by one sub-hologram, whose position depends on the position of the object point, and whose size depends on the observer position. The region of the sub-hologram on the light modulator means will be referred to below as modulator region. The modulator region is that sub-region of the light modulator means which is required for reconstructing the object point. At the same time, the modulator region defines which pixels on the light modulator must be addressed in order to reconstruct that object point. The modulator region will remain in a fixed position if the object point is an object point which is fixed in space. This means that the object point to be reconstructed changes its position depending on the observer position. A change of the modulator region in dependence on the observer position allows the object point to be encoded at a fix position, i.e. its position in space does not change depending on the observer position. As far as the present invention is concerned, those principles can be applied analogously. According to a most simple embodiment, the centre of the modulator region lies on the straight line which runs through the object point to be reconstructed and the centre of the visibility region. In a most simple embodiment, the size of the modulator region is determined based on the theorem of intersecting lines, where the visibility region is traced back through the object point to be reconstructed to the light modulator means.

Also if sub-holograms are preferably used, a pixel, which represents the smallest controllable unit of the light modulator means, does not only comprise the information of a single sub-hologram, but, as a result of the superpositions, the information of multiple sub-holograms.

The results of a 3D rendering graphics pipeline, which describes the conversion of a three-dimensional scene into pixelated image data in the form of a two-dimensional projection of the three-dimensional scene, are provided in two memory sections, namely the frame buffer and Z buffer.

The present invention is based on the idea that for each object point which is visible from an observer position, and for which the pixelation process of the 3D rendering graphics pipeline is completed so that at least the respective colour and depth information is provided, the sub-hologram for that object point is determined immediately and added to an entire hologram. The hologram values are thus immediately generated in the holographic pipeline with the sub-holograms or the entire hologram for each object point which has been completely rendered by the 3D rendering graphics pipeline. Following the idea of the present invention, it must be noted that the scene will at that point not have been processed completely yet by the 3D rendering graphics pipeline. Subsequent changes of object points, in particular as regards visibility, colour and brightness are thus still possible. The visibility of an object point can for example change as an effect of the rendering process of the entire scene, so that an object point which has been visible so far is now covered by an object point which is closer to the observer.

The present invention is further based on the principle to also correct an entire hologram with a contribution of an object point whose properties have changed in the course of the rendering process.

In one embodiment of the general idea of this invention, the method comprises the steps that for each object point which is visible from the observer position, and for which depth and colour information have been initially provided or updated, in the holographic pipeline (A) the sub-hologram which corresponds to that current or visible object point and the corresponding differential sub-hologram (SD) with (SD=SHN−SHX) are immediately computed as the difference of the corresponding sub-hologram of the current object point and the sub-hologram of an object point which is now obsolete or no longer visible, (B) the differential sub-hologram is added to the entire hologram ($H\Sigma_{SLM}$), and (C) the information link of the current object point to the corresponding sub-hologram is made available for reading in at least one sub-hologram memory. The sub-hologram can be physically written to the sub-hologram memory. It is also possible to make this information link available for reading by way of reference, index and memory sections or the like.

The entire hologram is compensated as desired. In analogy to the preceding process step, the information link of the current object point to its sub-hologram is made available for reading in the sub-hologram memory.

The differential sub-hologram of a current object and an obsolete object point can be found with the help of the equation (SD=SHN−SHX) as the difference of the corresponding current sub-hologram and the obsolete sub-hologram. The differential sub-hologram of object points is defined according to the updated depth information a) with (SD=SHN−SHX) by the difference of the sub-hologram of an object point which is closer to the observer, and the sub-hologram of an object point which is now covered by the other object point and thus no longer visible, or, vice versa b) with (SD=SHN−SHX) by the difference of the sub-hologram of an object point which is further away from the observer, and the sub-hologram of an object point which has been visible so far.

In order to compute the differential sub-hologram of the current object point and the obsolete object point, the sub-hologram of the obsolete object point is preferably read from the sub-hologram memory and is used for the computation. When computing the differential sub-holograms it is assumed that all sub-holograms in the sub-hologram memory are initialised with '0' values prior to the computing steps. This ensures that the differential sub-hologram with SD=SHN−SHX also applies to object points whose depth information are provided for the first time. In that case, the sub-hologram SHX of the obsolete object point is '0' and thus does not have an influence on the difference computation.

It can thus be seen that the algorithm is identical for all object points, irrespective of whether their depth information is determined for the first time, or updated. A case differentiation as regards the position of the object point in relation to the observer or the like is not necessary. These algorithms can preferably be implemented in dedicated computing units, thus ensuring a high-performance computation.

Finally, the process steps are based on the principle that the hologram values for the sub-hologram are generated at a fast pace. Particularly preferred methods in this regard will be indicated in the embodiments.

The sub-hologram memory will now be specified in detail. As a result of the processes in the 3D rendering graphics pipeline, the three-dimensional scene is written to the frame buffer and Z buffer in a pixelated manner, where this pixelation with m rows and n columns generally corresponds to the resolution of the display panel. This pixelation is preferably adopted for the sub-hologram memory, so that an element entry in the grid, which corresponds to a respective entry in the frame buffer and Z buffer, also corresponds to a sub-hologram. It is generally possible to use any other memory architecture; however, information about the object point may then also have to be written to the sub-hologram memory. Such an information link of an object point to its sub-hologram for example comprises a reference to the data, to respective memory sections etc. Additionally, it is possible to use ancillary, descriptive data such as size, position, index lists or index sections in various frames of reference, which allow or facilitate quick data access and preferred algorithm techniques.

The sub-holograms of an object point are preferably retrieved or read from look-up tables, according to the principle described in document DE 10 2006 042 324, or are analytically generated according to the already-cited method described in document WO 2006 066919. The look-up tables for the sub-holograms are also preferably generated according to the principle of the latter method, or created in advance. The look-up tables are created by generating in advance the respective entry of the sub-hologram for each possible object point in the permitted observer movement range, thus making those entries available for reading. Another particularly preferred method will be explained in the embodiments. For implementing the method, the 3D rendering graphics pipeline is extended by the holographic pipeline, which implements the above-mentioned process steps. The course of the method described here in summary does not imply that the computing units (hardware) required for hologram computation must be physically separate and disposed in line after the computing units for 3D computation. It can be imagined as well that with new-generation programmable graphics cards the hologram computation is performed in the computing units (hardware)

for 3D computation. This solution is preferably implemented on the same graphics system or graphics chip on which also the 3D rendering graphics pipeline operations are run. However, an implementation on an additional chip forms a possible option. Both processing units can access the same physical memory of the graphics card, so that—in addition to the Z buffer, colour map and other data for the 3D rendering graphics pipeline—also data required for the holographic pipeline can be stored there.

The demands made on the generation of the hologram values in real time are particularly met thanks to the usage of the look-up tables for the sub-holograms. If the time needed for the computation of an object point by the 3D rendering graphics pipeline is longer than or equal to the computation time needed for the holographic transformation and encoding of the object point, the generation of the hologram values will be substantiated. As in conventional video processing technologies, a high refresh rate can be provided for the display of computer-generated video holograms, where a real-time generation is also possible with the help of inexpensive and simple computing units.

The present invention allows the object points to be processed by the 3D rendering graphics pipeline in an optional, non-sequential order. Analogously, there are no restrictions to the order in which the results of the pipeline must finally be provided for the individual object points. A multitude of object points can thus be simultaneously rendered in parallelised processes and provided to the holographic pipeline. The methods concerning how and in which order the object points—and ultimately the entire scene—are rendered are based on known method and optimisations.

BRIEF DESCRIPTION OF THE DRAWINGS

The physical forms of the present invention will be described in detail below with the help of preferred embodiments, and in conjunction with the accompanying drawings, wherein.

A particularly preferred method for generating complex hologram values from sub-holograms will be explained in detail below with the help of accompanying drawings, wherein FIG. B1 illustrates the principle on which a holographic display device is based, and a modulator region representing an object point, FIG. B2a is a side view of the display device with an imaging element comprising a lens and a prism, FIG. B2b shows a modulator region and a vertically effective prism, FIG. B2c shows a modulator region and a horizontally effective prism, FIG. B3 shows a flowchart of the method according to the present invention; and FIG. B4 shows an option of the method for the reconstruction of an object point behind the hologram plane.

DETAILED DESCRIPTION

Figure 1A:
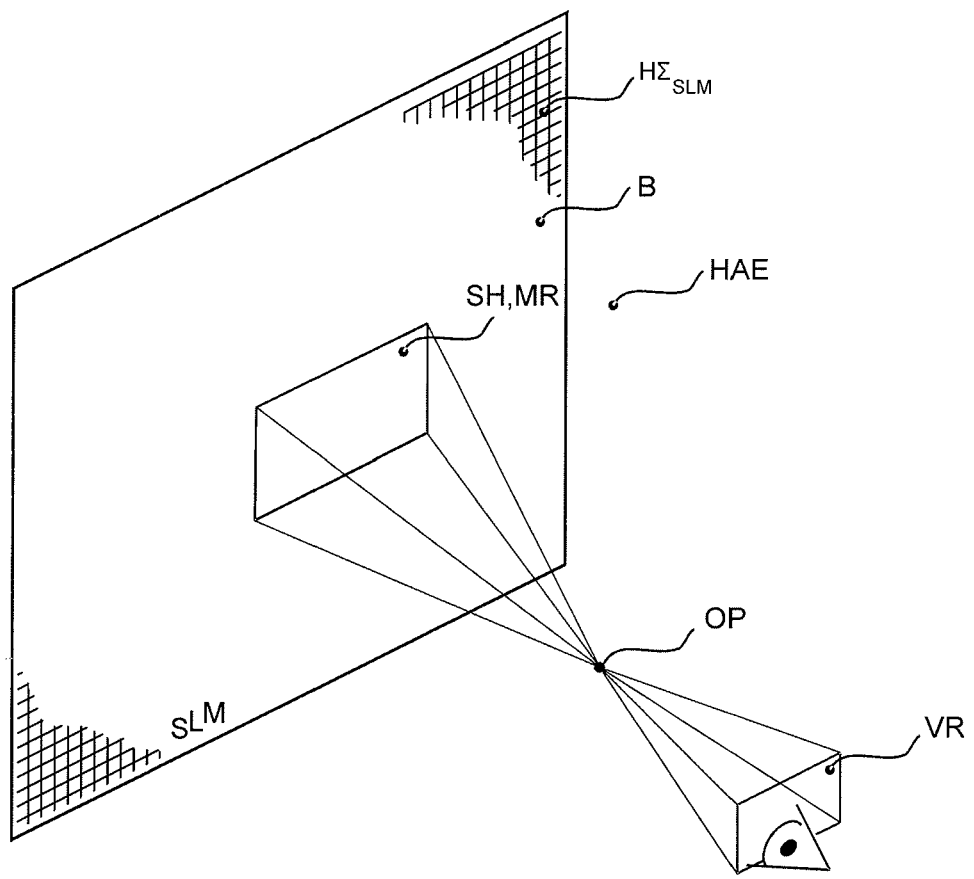
FIG. 1a illustrates the principle on which a holographic display device is based.

FIG. 1a illustrates the general principle on which a holographic display device (HAE) for one observer is based. The principle applies accordingly to multiple observers. The position of an observer is characterised by the position of his eye or his pupils (VP). The device comprises a light modulator means (SLM), which is identical to the screen means (B) in this embodiment in order to keep things simple; and it superimposes the wave fronts which are modulated with information of object points of a scene (3D-S) in at least one visibility region (VR). The visibility region is tracked to the eyes. The reconstruction of a single object point (OP) of a scene (3D-S) only requires one sub-hologram (SH) as a subset of the entire hologram ($H\Sigma_{SLM}$) encoded on light modulator means (SLM). The modulator region (MR) is the region of the sub-hologram on the light modulator (SLM). As can be seen in this Figure, the modulator region (MR) only comprises a small subsection of the light modulator means (SLM). In a most simple embodiment, the size of the modulator region (MR) is determined based on the theorem of intersecting lines, where the visibility region (VR) is traced back through the object point (OP) to be reconstructed to the light modulator means (SLM). Further, the indices of those pixels on the light modulator means (SLM) which are required to reconstruct this object point are thus determined.

Figure 1B:
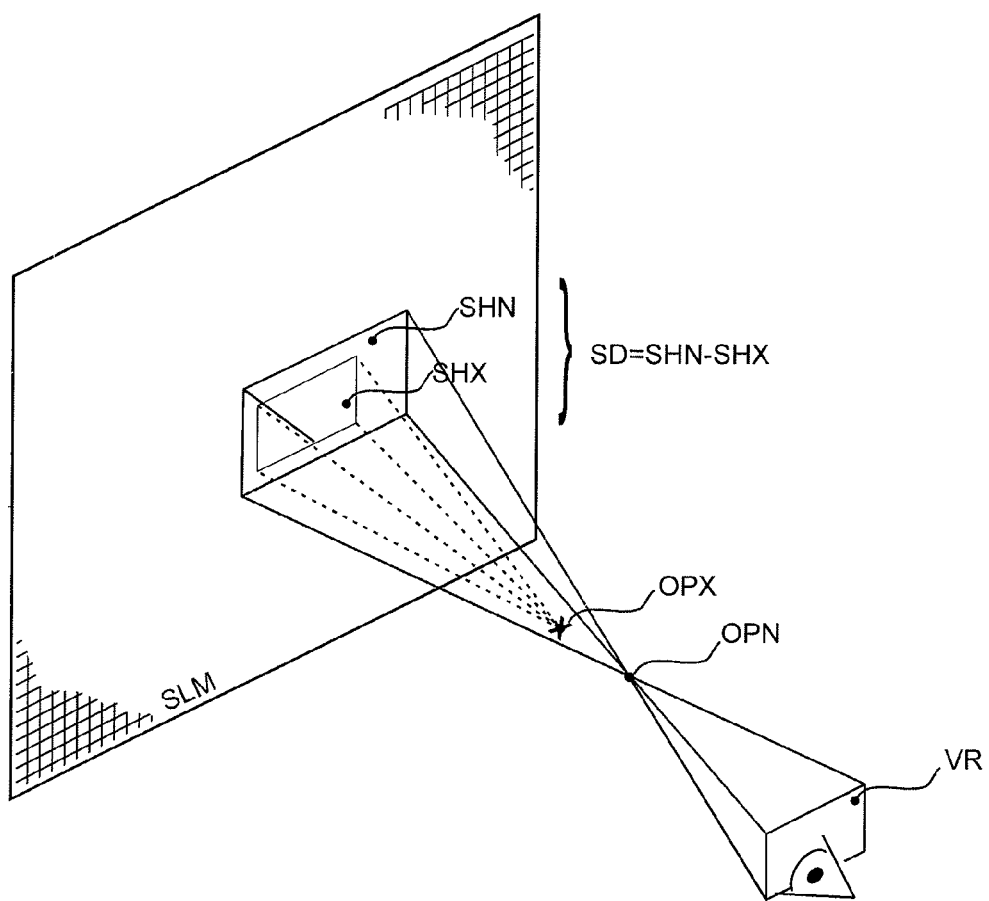
FIG. 1b shows the differential sub-hologram for an appearing object point.
Figure 1C:
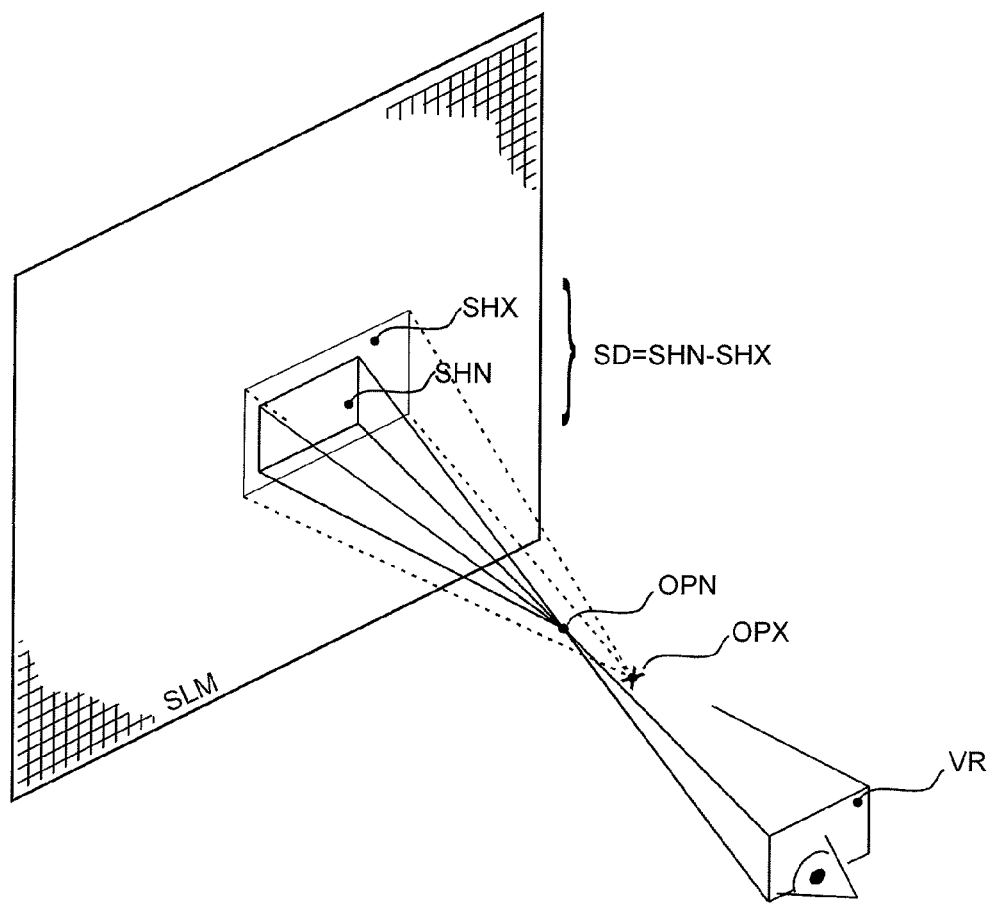
FIG. 1c shows the differential sub-hologram for a disappearing object point.

FIGS. 1b and 1c illustrate the principle of the sub-holograms as the general underlying principle of the following description of the method. Based on the method according the present invention, for each object point which is visible from an observer position (VP), and for which the pixelation process of the 3D rendering graphics pipeline is completed so that at least the respective colour and depth information is provided, the sub-hologram (SH) for that object point is determined immediately, i.e. without further delay, and added to the entire hologram ($H\Sigma_{SLM}$). However, the immediate processing of the corresponding sub-hologram (SH) means that for example the visibility of an object point (OP) can change in the course of the rendering process of the scene. An object point can for example be covered by an object point which is closer to the observer, or becomes invisible again due to one of the many image effects, e.g. shades, reflections, haze etc.

Referring to FIG. 1b, the 3D rendering graphics pipeline found for an object point (OPX) that a new object point (OPN) lies closer to the observer. Generally speaking, a new object point (OPN) thus appeared in the currently rendered scene compared to the preceding intermediate result provided by the 3D rendering graphics pipeline, said new object point (OPN), however, as shown in the Figure, covering an object point (OPX) which has been visible in the immediate result, according to the visibility of the observer, so that the initially visible object point now becomes invisible. As will be described in more detail below, it is here necessary to subtract from the entire hologram ($H\Sigma_{SLM}$), which forms the superposition of the sub-holograms of the object points, the obsolete sub-hologram (SHX) of the invisible object point (OPX), and to add the new sub-hologram (SHN) of the newly visible object point (OPN). In that case, the differential sub-hologram (SD=SHN−SHX) is defined as the difference of the sub-hologram (SHX) of the obsolete object point (OPX) and the sub-hologram (SHN) of the new object point (OPN), and can thus be computed.

Referring to FIG. 1c, an object point (OPX) disappeared in the currently rendered scene, compared to a preceding immediate result provided by the 3D rendering graphics pipeline, so that, as can be seen in the Figure, an object point (OPN), which was hidden so far, now becomes visible, according to the visibility of the observer. In that case, the differential sub-hologram (SD=SHN−SHX) is defined as difference between the sub-hologram (SHX) of the disappeared object point (OPX) and the sub-hologram (SHN) of the newly visible object point (OPN), and can thus be computed. Analogously to what was said under FIG. 1b, the entire hologram (H$\Sigma_{SLM}$) is to be added accordingly. The third case of a fix object point with different colour and/or intensity will be described below without reference to a certain Figure. The differential sub-hologram here describes the corresponding colour or intensity information. However, it is usually sufficient to specify those changes with the help of descriptive data, instead of a sub-hologram.

Figure 2:
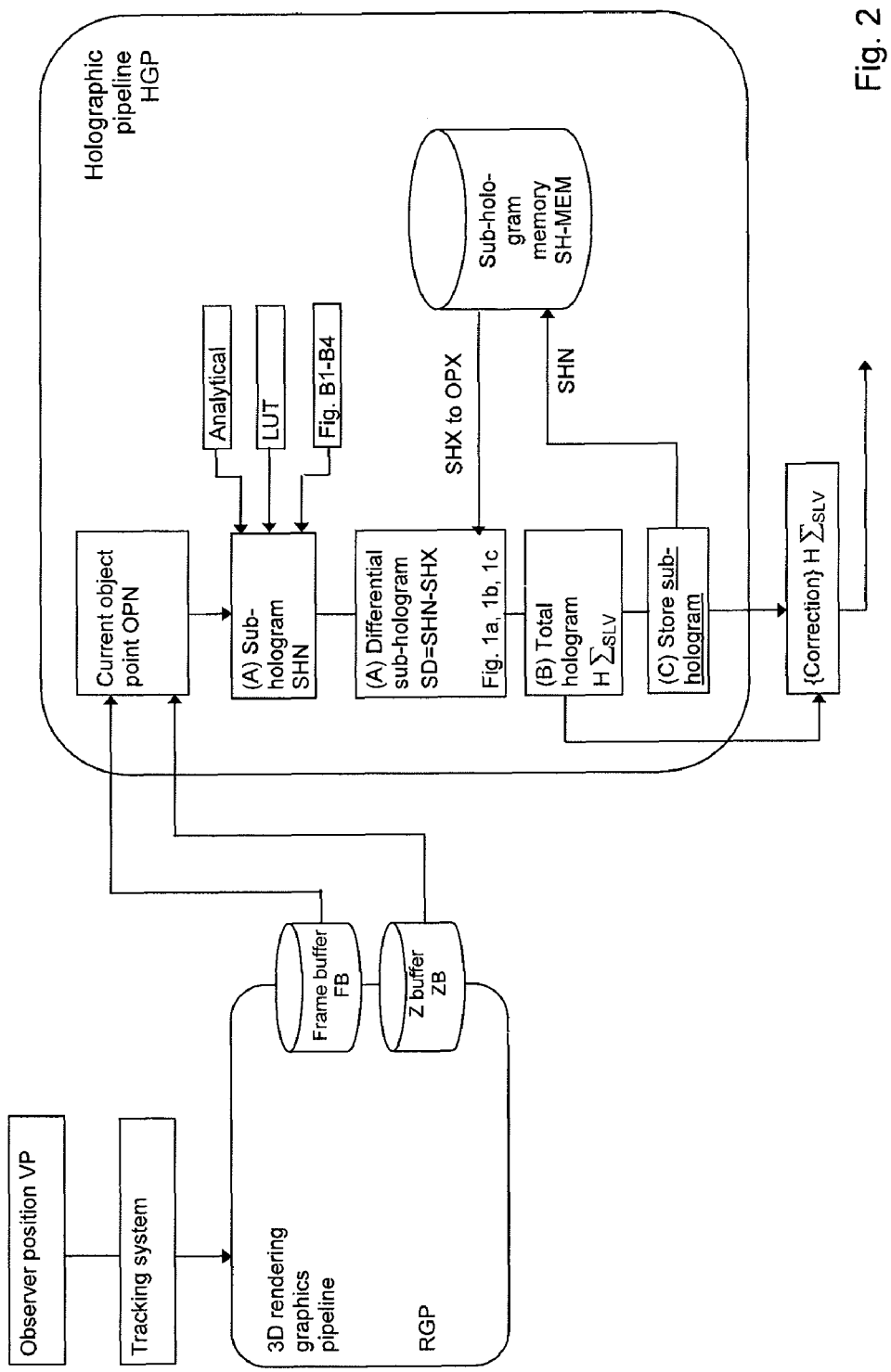
FIG. 2 shows a flowchart of the method according to this invention, and includes a schematic diagram of the device according to this invention.

FIG. 2 illustrates the method for generating the entire hologram (H$\Sigma_{SLM}$) and shows how a 3D rendering graphics pipeline (RGP) is extended by a holographic pipeline (HGP) in order to generate the complex hologram values for the light modulator (SLM) of the holographic display device (HAE) from the image data with depth information. The device for implementing the method is thereby outlined briefly at the same time. For example, the conversion of screen coordinates into device coordinates, texturing, clipping and anti-aliasing are performed in the 3D rendering graphics pipeline (RGP). The results of the 3D rendering graphics pipeline (RGP), which describes the conversion of the three-dimensional scene (3D-S) into pixelated image data in the form of a two-dimensional projection of the scene, are provided in two memory sections:

The frame buffer (FB) comprises the colour values, i.e. the colour map of the scene seen by the observer.

The Z buffer (ZB) comprises the depth map of the scene in a normalised representation, as seen from the observer position.

To facilitate understanding, those memory sections of the graphics pipeline are indicated separately and are shown schematically in FIG. 2. The data of those memory sections serve as input information for the holographic pipeline (HGP), which follows in line, and which generates the complex hologram values for the entire three-dimensional scene.

According to the present invention, it is not waited until the complete Z map and colour map of the entire scene are available, but the holographic computations for the object point will be executed immediately as soon as at least the depth and colour information of the object point which was processed by the 3D pipeline is available.

Based on the method according to the present invention, for each object point (OP) which is visible from an observer position (VP), and for which the pixelation process of the 3D rendering graphics pipeline is completed so that at least the respective colour and depth information is provided, the sub-hologram (SHN) for that object point (OPN) is determined immediately, i.e. without further delay, and added to the entire hologram (H$\Sigma_{SLM}$). The 'pixelation' process group of the 3D rendering graphics pipeline (RGP) and the process group for the generation of the hologram values of the holographic pipeline (HGP) are executed simultaneously.

In this embodiment, the sub-holograms (SH) for the propagation of the light waves into the visibility region (VR) are retrieved from look-up tables (LUT), as shown in FIG. 1. A further, particularly preferred method for generating the sub-holograms will be explained in detail below. For each object point (OP) which has been rendered completely by the 3D rendering graphics pipeline and for which depth information and colour information are provided for the first time or currently updated, the sub-hologram (SHN) for this current object point (OPN) and the corresponding differential sub-hologram (SD) are computed immediately. As already described in conjunction with FIGS. 1b and 1c, the differential sub-hologram (SD) with (SD=SHN−SHX) is determined as the difference of the corresponding sub-hologram (SHN) of the current object point (OPN) and the sub-hologram (SHX) of the object point (OPX) which has become obsolete. The sub-hologram (SHX) of the obsolete object point (OPX), which is required for the difference computation, is read from the sub-hologram memory (SH-MEM). The individual sub-holograms of the object points are superposable and can be complexly added so to form the entire hologram.

Entire hologram=complex sum of the sub-holograms with $$H\Sigma_{SLM} = \Sigma SH_i$$

The differential sub-holograms are superposable in the same way.

Finally, the computed sub-hologram (SHN) of the current object point (OPN), is written to the sub-hologram memory (SH-MEM) and made available for reading. Should that object point (OPN) become obsolete again due to updated data output by the 3D rendering graphics pipeline, or if other properties change which would require the entire hologram (H$\Sigma_{SLM}$) to be corrected, the corresponding sub-hologram (SH) in the sub-hologram memory (SH-MEM) will be provided again.

The correction of the entire hologram (H$\Sigma_{SLM}$) has been described with the example of the visibility of object points. The method also relates analogously to other properties of the object points, i.e. colour, brightness, luminous intensity. Further, corrections can be made to the entire hologram (H$\Sigma_{SLM}$) in order to improve the general quality of the holographic representation.

In another embodiment, it is also possible to add the entire hologram (H$\Sigma_{SLM}$) after the corresponding sub-holograms for all or almost all object points have been computed, and the corresponding information link has been stored. However, the ideally required computing time is exceeded due to the subsequent generation of the entire hologram.

The demands made on the generation of the hologram values in real time are particularly met thanks to the usage of the look-up tables for the sub-holograms. If the time needed for rendering an object point by the 3D rendering graphics pipeline is longer than or equal to the computation time needed for the holographic transformation and encoding of the object point according to the present invention, the generation of the hologram values will be substantiated.

Referring to FIG. 2, the 3D rendering graphics pipeline (RGP) and the holographic pipeline (HGP) are shown separately in order to ensure good understanding of the basic principle; however, it does not necessarily mean that the computing means are spatially separated. The method is preferably implemented on the same processor or graphics chip on which also the 3D rendering graphics pipeline operations are run. The 3D rendering graphics pipeline is preferably extended as regards hardware and software. However, an implementation of the holographic pipeline on an additional chip forms a preferred possible option. Both processing units, i.e. the 3D rendering graphics pipeline and the holographic pipeline, may access the same physical memory of the graphics card, so that—in addition to the Z buffer, colour map and other data for the 3D pipeline—also other data can be stored or exchanged there. For example, the look-up tables for the sub-holograms are preferably stored in those memory sections.

In a preferred embodiment of the present invention, the holographic display device provides its configuration data to the device for implementing the method. Those data for example specify the size of the light modulator, its resolution, pixels and, if necessary, descriptive data concerning the encoding method, e.g. the Burckhardt encoding, two-phase encoding or other suitable encoding methods. The generation of the hologram values can thus be configured and adapted to the given or detected holographic display device. A device for implementing the method is thus not only limited to a particular holographic display device, but can be used universally in devices which preferably take advantage of the basic principle of sub-holograms.

A particularly preferred method for generating the sub-holograms will be explained below with the help of FIG. B1 to B4. The method is based on a three-dimensional scene (3D-S) with colour and depth information, which is composed of a multitude of object points. Also if sub-holograms are preferably used, a pixel, which represents the smallest controllable unit of the light modulator, does not only comprise the information of a single sub-hologram, but, as a result of the superpositions, the information of multiple sub-holograms.

The preferred method is based on the idea that the complex hologram values of a sub-hologram are computed in a modulator region of the light modulator means from the wave front of the object point to be reconstructed, in that the transmittance functions or modulation functions of an imaging element, which is modelled in the modulator region and in whose focal point the object point to be reconstructed lies, are computed and analysed. The hologram plane is defined by the position of a screen means, where for simplification the screen means will be the light modulator itself in the following description.

According to a preferred embodiment of the method, the imaging element includes a lens which is disposed in the hologram plane, which has the focal length f and which is inclined. An inclined lens is composed of a lens which is not inclined in relation to the hologram plane and a prism which is effective in both the horizontal and vertical direction. Strictly speaking, a prism does not define a sub-hologram, because no object point is reconstructed due to the non-focal prism function. However, in order to maintain a certain clarity of the inventive thought, this will be described so, because the prism also provides a part to the complex hologram values in the modulator region. The method will be described below in detail with the example of a lens and a prism. Of course, the method also applies to a lens or a prism on its own; in such a case, the process steps or the corresponding terms are not carried out or are neglected. For computing the complex values of the sub-hologram, this detailing of the method comprises the following steps for each visible object point of the scene:

A: Determining the size and the position of the modulator region as described above, but the modulator region will then be given a local coordinate system, where the point of origin is located in its centre, the x axis describes the abscissa and the y axis describes the ordinate. 'a' is the half-width and 'b' the half-height of the modulator region, where those interval boundaries are included in the following terms.

B: Determining the sub-hologram of the lens in the hologram plane:
  B1: Determining the focal length f of the lens:
    The focal length f of the lens preferably is the normal distance of the object point to be reconstructed from the hologram plane.
  B2: Complex values of the corresponding sub-hologram of the lens:
    The complex values of the corresponding sub-hologram are determined using the equation $z_L = \exp\{+/-i*[(\pi/\lambda f)*(x^2+y^2)]\}$, where $\lambda$ is the reference wavelength, f is the focal length and (x, y) is the corresponding coordinate pair. The negative sign here is due to the characteristic of a concave lens. A convex lens would be identified by a positive sign.
  B3: Thanks to the symmetry in regard to the x and y axes, it is sufficient to determine the complex values in one quadrant and to apply the values to the other quadrants by using a rule of sign.

C: Determining the sub-holograms of the prisms (P) in the hologram plane:
  The chosen prisms run through the abscissa or ordinate, as shown in the figures below.
  C1: Determining the linear factor $C_x$ of the prism (PH) with horizontal effective direction, which is described by the following equation in the interval $x \in [-a,a]$ $C_x = M*(2\pi/\lambda)$;

where M is the inclination of the prism.
  C2: Determining the linear factor $C_y$ of the prism (PV) with vertical effective direction, which is described by the following equation in the interval $y \in [-b,b]$ $C_y = N*(2\pi/\lambda)$;

where N is the inclination of the prism.
  C3: Determining the complex values of the corresponding sub-hologram of the combined prisms:
    The complex values for the corresponding sub-hologram are determined by superimposing the two prism terms:

$z_P = \exp\{i*[C_x*(x-a)+C_y*(y-b)]\}$

The superimposed prism runs through the point of origin of the local coordinate system.
  C4: A prism term drops if the holographic display device exhibits the characteristic to image the light source into the visibility region.

D Modulating the sub-holograms for lens and prisms:
  The complex values of the lens and prisms are complexly multiplied in order to determine the combined sub-hologram:

$z_{SH} = z_L * z_P$ or, symbolically, $SH = SH_L * SH_P$

E: Application of the random phase:
  Each modulated sub-hologram from step D is assigned a random phase in order to ensure a homogeneous brightness distribution in the visibility region. The random phase is added to the sub-hologram by way of a complex multiplication:

$z_{SH} := z_{SH} \exp(i\phi_0)$ or, symbolically, $SH := SH \exp(i\phi_0)$

The random phase is individually assigned to each sub-hologram. Globally, the random phases of all sub-holograms are preferably distributed homogeneously.

F: Intensity modulation:
  The complex values are given an additional multiplication factor, which represents the intensity or brightness.

$z_{SH} = C * z_{SH}$ or, symbolically, $SH := C*SH$.

G: If the entire hologram is computed, the sub-holograms will be superimposed so to form the entire hologram. In a simple embodiment, the sub-holograms are complexly added to the entire hologram, considering the position of the sub-holograms.

Entire hologram=complex sum of all sub-holograms with $$H\Sigma_{SLM} = \Sigma SH_i$$

or, symbolically, $z_{SLM} = \Sigma z_{SHi}$ (with regard to a global coordinate system)

The method is preferably used for visible object points only. The visibility of the object point is determined as a result of the rendering process of the scene by a 3D rendering graphics pipeline, and it depends on the observer position, that is the position of the eye pupils, and thus from the position of the visibility region, which is tracked to the position of the pupils.

The detailed description relates to the computation of the best possible solution. It is of course generally possible to replace the above-described function terms with more simple function terms, if a reduced reconstruction quality is accepted or even desired. However, it can be seen that updated process steps are applied in order to improve the reconstruction quality. Lenses or prisms can for example be chosen such to correct aberrations, tolerances of light modulator means etc. The same also applies to the exemplarily mentioned methods for determining the modulator region.

As can be seen in FIG. B1, which is based on FIG. 1, the modulator region (MR) will be given a coordinate system, where the point of origin is located in its centre, the x axis describes the abscissa and the y axis describes the ordinate. The modulator region (MR) has the half-width 'a' and the half-height 'b'.

FIG. B2a is a side view of the holographic display device (HAE), illustrating the general principle of the method. Similar to FIG. B1, the modulator region (MR) is derived from the visibility region (VR). This region is located in the hologram plane (HE), where the light modulator (SLM) is disposed. The modulator region is given the above-mentioned coordinate system. The imaging element (OS), which is here composed of a focussing lens (L) and a prism (P), lies in the modulator region (MR). The Figure only shows the vertically effective prism wedge, and the imaging element (OS) is shown in front of the hologram plane (HE) to make things clearer.

FIG. B2b shows a horizontally effective prism wedge (PH) in front of the modulator region (MR) together with the coordinates and dimensions used. The prism wedge here runs through the ordinate.

FIG. B2c analogously shows a vertically effective prism wedge (PV), which runs through the abscissa. The two prism wedges are superimposed as described below.

FIG. B3 shows a flowchart of the preferred method. Starting point of the method is a three-dimensional scene (3D-S) which is composed of a multitude of object points (OP). Colour and depth information are available for the object points (OP). The visibility of an object point is determined, based on its depth information, depending on the observer position, i.e. that of the eye pupils of the observer.

In step (A), the size and the position of the respective modulator region (MR) in the hologram plane (HE), or on the light modulator means, are determined for each visible object point. According to the idea of the present invention, the object point (OP) to be reconstructed is interpreted as the focal point of an imaging element which lies in the hologram plane. The imaging element here is interpreted as a combination of a focussing lens (L) and, as shown in FIG. 2b, 2c, of vertically or horizontally effective prisms (PH, PV). In step (B1), the focal length of the lens (L) is thus determined for each visible object point as the normal distance of the object point (OP) from the hologram plane (HE). In step (B2), the complex values for the corresponding sub-hologram ($SH_L$) are determined using the equation $$z_L = \exp\{-i^*[(\pi/\lambda f)^*(x^2+y^2)]\}$$

where λ is the reference wavelength, f is the focal length and (x, y) is the corresponding local coordinate pair. The coordinate system is defined as described above.

In step (C), the sub-holograms ($SH_P$) of the prisms (P) in the hologram plane are determined. The determination of the linear factor $C_x$ of the prism (PH) with horizontal effective direction uses the equation $C_x = M^*(2\pi/\lambda)$, where M is defined as the inclination of the prism. The linear factor $C_y$ of the vertically effective prism is found with an analogous equation, but with the inclination N. The complex values of the corresponding sub-hologram ($SH_P$) are determined by superimposing the two prism terms:

$$SH_P := z_P = \exp\{i^*[C_x^*(x-a)+C_y^*(y-b)]\}$$

One prism term drops if the holographic display device exhibits the characteristic to image the light source into the visibility region (VR).

Now that the sub-holograms ($SH_L$) of the lens (L) and those ($SH_P$) of the prisms (P) are available, they are superimposed so to form in step (D) the combined sub-hologram (SH) by complexly multiplying the complex values of the lens and of the prisms:

$$z_{SH} = z_L^* z_P$$

or, symbolically, $SH = SH_L^* SH_P$.

In step (E), the sub-hologram (SH) is given a homogeneously distributed random phase. In step (F), an intensity modulation is performed, where the sub-hologram (SH) is multiplied with an intensity factor:

$$z_{SH} = C^* z_{SH}$$

or, symbolically, $SH := C^*SH$.

As desired, the combined sub-hologram (SH) of an object point (OP) is now completely available. In an additional process step (G), it would be possible to add the sub-holograms of the object points so to form an entire hologram ($H\Sigma_{SLM}$). The individual sub-holograms ($SH_i$) of the object points are superposable and are complexly added so to form the entire hologram ($H\Sigma_{SLM}$).

Entire hologram=complex sum of all sub-holograms of the object points with $$H\Sigma_{SLM} = \Sigma SH_i$$

or $z_{SLM} = \Sigma z_{SHi}$ (with regard to a global coordinate system).

The entire hologram ($H\Sigma_{SLM}$) represents the hologram of all object points. It thus represents and reconstructs the entire scene (3D-S).

With the help of this method, the sub-holograms for an interactive real-time holographic reconstruction can be generated for object points at any position in the reconstruction volume using standard hardware components which are commercially available today. The preferred method is preferably used to determine the sub-holograms and to fill look-up tables with those sub-holograms. In analogy to the method and device according to the present invention, the preferred method is suitable for holographic display devices which also preferably take advantage of the principle of sub-holograms.

This includes in particular, as already mentioned above, devices described in WO 2004/044659, WO 2006/027228, WO 2006119760, and DE 10 2006 004 300.

LIST OF REFERENCE NUMERALS

HAE Holographic display device
RGP 3D rendering graphics pipeline
FB Frame buffer of the 3D rendering graphics pipeline
ZB Z buffer of the 3D rendering graphics pipeline
HGP Holographic pipeline
3D-S Scene, structured by object points (OP)
SLM Light modulator means of a HAE
B Screen means of a HAE
VR Visibility region(s)
OP Object point, general
$OP_n$, $OP_{n+1}$, . . . . Object point, especially with reference index
OPN Newly visible object point
OPX Obsolete object point
SHN Sub-hologram of a new object point
SHX Sub-hologram of an obsolete object point
SH Sub-hologram, general
$SH_i$ Sub-hologram, general, indexed
MR Modulator region
$SH_n$, $SH_{n+1}$, . . . . Sub-hologram, with reference index
SD Differential sub-hologram
SH-IND Additional information of a sub-hologram (SH)
$H\Sigma_{SLM}$ Entire hologram
LUT Look-up table
SH-MEM Sub-hologram memory
OS Imaging element
L Lens
P Prism
PH Prism with horizontal effective direction
PV Prism with vertical effective direction

The invention claimed is:

1. Method for the real-time generation of video holograms for a holographic display device with at least one light modulator means on which a scene is to be encoded as an entire hologram and is to be seen as a reconstruction from a visibility region which lies within one periodicity interval of the reconstruction of the video hologram, with a 3D rendering graphics pipeline which structures the scene into object points, where the scene is represented by image data with depth information, and which thereafter determines and provides at least colour and depth information for the object points, where a single object point of the scene is generated by one sub-hologram which is to be encoded on a limited sub-region of the light modulator means, and where the entire hologram is formed by way of a superposition of sub-holograms, and with a holographic pipeline for the generation of the complex hologram values of the object points, whereby the holographic pipeline immediately determines complex hologram values for each object point which is visible from the actual observer position as soon as for that object point depth information and colour information are provided for the first time or currently updated in that (A) the sub-hologram SHN and a corresponding differential sub-hologram SD which correspond to that visible object point are determined, whereby the differential sub-hologram SD with SD=SHN−SHX is defined to be the difference of the corresponding sub-hologram SHN of the visible object point and the sub-hologram SHX of an object point which is now obsolete, i.e. no longer visible, (B) the differential sub-hologram SD is added to the entire hologram, and (C) the information link of the object point and of the sub-hologram SHN of this object point is made available in at least one sub-hologram memory.

2. Method according to claim 1, where the differential sub-hologram SD of object points is defined according to the updated depth information a) with SD=SHN−SHX by the difference of the sub-hologram SHN of an object point which is closer to the observer position, and the sub-hologram SHX of an object point which is now covered by the former and thus no longer visible, or, vice versa, b) with SD=SHN−SHX by the difference of the sub-hologram SHN of an object point which is further away from the observer position, and the sub-hologram SHX of an object point which has been visible so far.

3. Method according to claim 2, where in order to compute the differential sub-hologram SD of a visible object point and an obsolete object point with SD=SHN−SHX the sub-hologram SHX of the obsolete object point is retrieved from the sub-hologram memory and applied in the computation.

4. Method according to claim 1, where the information link of an object point and its sub-hologram is retrievable through a corresponding reference to the entry in at least one look-up table of the sub-holograms, or through a reference to the sub-hologram memory.

5. Method according to claim 1, where for each object point the contribution of the corresponding sub-hologram is retrieved from look-up tables.

6. Method according to claim 1, where the hologram values of the sub-hologram of an object point are determined, or where the corresponding entry of the sub-hologram in one or multiple look-up tables is generated in advance for each possible object point in a defined volume, where the following steps are carried out aided by a computer:

A diffraction image from each object data set of each tomographic scene section is computed in the form of a separate two-dimensional distribution of wave fields for an observer plane, which is situated at a finite distance and parallel to the section planes, where the wave fields of all sections are computed for at least one common visibility region, The computed distributions of all section layers are added to define an aggregated wave field for the visibility region in a data set which is referenced in relation to the observer plane, and For generating a hologram data set for a common computer-generated hologram of the scene, the reference data set is transformed into a hologram plane, which is situated at a finite distance and parallel to the reference plane, where the light modulator means lies in the hologram plane.

7. Method according to claim 1, where the hologram values of a sub-hologram of an object point are determined, or where the corresponding entry of the sub-hologram in one or multiple look-up tables is generated in advance for each possible object point, where the complex hologram values of a sub-hologram are determined in a modulator region of the light modulator means out of the wave front of the object point to be reconstructed, in that the transmittance functions or modulation functions of a imaging element, which is modelled in the modulator region and in whose focal point the object point to be reconstructed lies, are computed and analysed.

8. Method according to claim 7, where the imaging element comprises at least one lens or where the imaging element comprises at least one lens and where the imaging element additionally comprises at least one prism.

9. Method according to claim 7, where the position of the modulator region is determined in that the centre of the modulator region lies on the straight line through the object point to be reconstructed and the centre of the visibility region or where the size of the modulator region is determined by ray tracing of the visibility region through the object point to the hologram plane.

10. Method according to claim 7, where each modulated sub-hologram SH of an object point is given a random phase, and the random phases of all sub-holograms are evenly distributed or where, considering the position of the sub-holograms SH, their superposition to form an entire hologram $H\Sigma_{SLM}$ is computed as the complex sum of the sub-holograms SH with $H\Sigma_{SLM}\Sigma SH_i$.

11. Method according to claim 1, where the complex hologram values are converted into pixel values of the light modulator means or where the complex hologram values are converted into pixel values of the light modulator means and where the complex hologram values are converted into Burckhardt components or two-phase components.

12. Computing device for generating video holograms for implementing the method according to claim 1, for extending a 3D rendering graphics pipeline, which structures a scene, which is represented by image data with depth information, into object points and then computes and provides at least colour information and depth information for those object points, and with a holographic pipeline, which generates complex hologram values of the object points for the representation of the scene on at least one light modulator means of a holographic display device, at least comprising Means for reading the determined colour values and the determined depth values of the object points,
Means for providing sub-holograms of object points regarding colour information and depth information,
Means for computing and storing an entire hologram,
Means for computing the differential sub-hologram of the object point,
Storage means to be used as sub-hologram memory, whereby the information link of the object point and the corresponding sub-hologram are made storable and retrievable.

13. Computing device according to claim 12, comprising at least means for reading the determined colour values of an object point from a frame buffer and the determined depth values from a Z buffer of the 3D rendering graphics pipeline or comprising at least storage means, whereby for each object point the contribution of the corresponding sub-hologram can be retrieved from at least one look-up table.

14. Computing device according to claim 13, where the complex hologram values are converted into pixel values of the light modulator means or where the complex hologram values are converted into pixel values of the light modulator means and where the complex hologram values are converted into Burckhardt components or two-phase components.

15. Computing device according to claim 12, comprising at least dedicated computing means which analytically determine the complex hologram values for each object point together with the holographic pipeline.

16. Computing device according to claim 12, comprising means for detecting the configuration data of a holographic display device or comprising means for detecting the configuration data of a holographic display device and where the means for detecting capture at least size or resolution of the light modulator means and type of encoding.

17. Holographic display device with a computing device according to claim 12 with a screen means, where the screen means is either the light modulator means itself on which the hologram of the scene is encoded, or an optical element, onto which a hologram or wave front of the scene encoded on the light modulator means is imaged.

18. Holographic display device according to claim 17, where the optical element is a lens or a mirror.

* * * * *